United States Patent [19]
Deaver et al.

[11] Patent Number: 6,086,120
[45] Date of Patent: Jul. 11, 2000

[54] METHODS AND APPARATUS FOR PERFORMING JET PUMP RISER PIPE REPAIRS

[75] Inventors: Gerald A. Deaver; Siamak Bourbour, both of Santa Clara, Calif.

[73] Assignee: General Electric Company, Schenectady, N.Y.

[21] Appl. No.: 08/985,528

[22] Filed: Dec. 5, 1997

[51] Int. Cl.[7] .................................................... F16L 3/10
[52] U.S. Cl. ........................... 285/421; 285/64; 403/234
[58] Field of Search ........................... 285/420, 421, 285/61, 64, 367; 248/229.1, 229.11, 229.14, 231.85, 230.9, 230.5, 230.2; 376/203, 402; 403/322.3, 321, 234, 235, 237

[56] References Cited

U.S. PATENT DOCUMENTS

| | | | |
|---|---|---|---|
| 4,639,020 | 1/1987 | Rung et al. | 285/367 |
| 5,388,308 | 2/1995 | Meeuwissen | 285/421 X |
| 5,497,973 | 3/1996 | Balzen et al. | 248/230.5 X |
| 5,522,625 | 6/1996 | Flick et al. | 285/367 X |

*Primary Examiner*—Anthony Knight
*Assistant Examiner*—Vishal Patel
*Attorney, Agent, or Firm*—Armstrong Teasdale LLP

[57] ABSTRACT

Methods and apparatus for supporting the lower riser assembly of a jet pump in a reactor pressure vessel (RPV) of a nuclear reactor are described. In one embodiment of the apparatus, the clamp apparatus facilitates applying compression force on the elbow. The clamp apparatus includes a lower elbow clamp, a riser clamp, and a bridge. The lower elbow clamp is positioned adjacent an interface between the elbow and the thermal sleeve of the jet pump riser pipe assembly. The riser clamp is secured to the riser pipe of the jet pump riser pipe assembly at a location adjacent an interface between the riser pipe and the elbow. The bridge rigidly couples the lower elbow clamp and the lower clamp so that as the respective clamps are secured to the lower riser assembly, a compression clamping force is placed on the piping and welds at each clamp.

18 Claims, 8 Drawing Sheets

METHODS AND APPARATUS FOR PERFORMING JET PUMP RISER PIPE REPAIRS

FIELD OF THE INVENTION

This invention relates generally to nuclear reactors and, more particularly, to methods and apparatus for repairing jet pump riser assemblies within a nuclear reactor pressure vessel.

BACKGROUND OF THE INVENTION

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core plate and is supported by a shroud support structure. Particularly, the shroud has a generally cylindrical shape and surrounds both the core plate and the top guide.

Water enters the RPV through an inlet nozzle in the RPV sidewall. As is well known, a jet pump riser assembly is coupled to the inlet nozzle and the jet pump riser assembly typically includes, in part, a thermal sleeve, a lower elbow and a riser pipe. The thermal sleeve extends through the inlet nozzle and is welded to one end of the elbow. The other end of the elbow is welded to the riser pipe. The riser pipe is positioned between and extends substantially parallel to the RPV sidewall and the shroud.

During operation, the jet pump assembly directs recirculation flow within the RPV. Accordingly, substantial amounts of water are forced through the jet pump assembly and significant hydraulic forces are exerted on the jet pump assembly, including on the jet pump assembly elbow. Furthermore, and during operation, a large amount of heat is generated within the RPV, thus placing thermal stress on the jet pump assembly. These hydraulic forces and thermal stresses can increase the susceptibility of metal in the jet pump riser assembly to Intergranular Stress Corrosion Cracking (IGSCC), and in extreme cases, the riser pipe could separate from the thermal sleeve which is undesirable.

It would be desirable to provide an apparatus which provides support for a jet pump riser assembly. It also would be desirable to provide such an apparatus which is easy to install.

SUMMARY OF THE INVENTION

These and other objects are attained by an apparatus which, in one embodiment, includes a clamp apparatus for applying compression forces on the lower elbow of a jet pump assembly. More particularly, and in accordance with one embodiment of the present invention, the clamp apparatus is configured to be secured to the edge of a weld crown at the interface between the thermal sleeve and the elbow and to the riser pipe, and to exert a compression clamp force on the jet pump components at the clamp locations.

The clamp apparatus includes a lower elbow clamp, a riser clamp, and a bridge. The lower elbow clamp is positioned proximate an interface between the thermal sleeve and the elbow. Particularly, the lower elbow clamp is secured to, e.g., a friction or interference fit, the weld crown of the weld at the interface between the thermal sleeve and the elbow. The riser clamp is secured to the riser pipe at a location adjacent an interface between the riser and the elbow. The lower elbow clamp and the riser clamp are interconnected so that as the riser clamp is drawn into a tight fit with the riser, the lower elbow clamp is drawn into a tight fit with the weld crown of the weld between the thermal sleeve and the lower elbow. The bridge forms a rigid connection between the riser clamp and the lower elbow clamp to prevent relative movement between the riser clamp and the lower elbow clamp.

By using the above described clamp apparatus, a compression clamp force is placed on the piping at the riser and lower elbow clamps. Such compression force facilitates a solid connection between the clamp structure and the pipes which limits separation and leakage in the event that the riser pipe separates from the thermal sleeve. In addition, the clamp apparatus is easy to install.

DETAILED DESCRIPTION OF THE DRAWINGS

Figure 1:
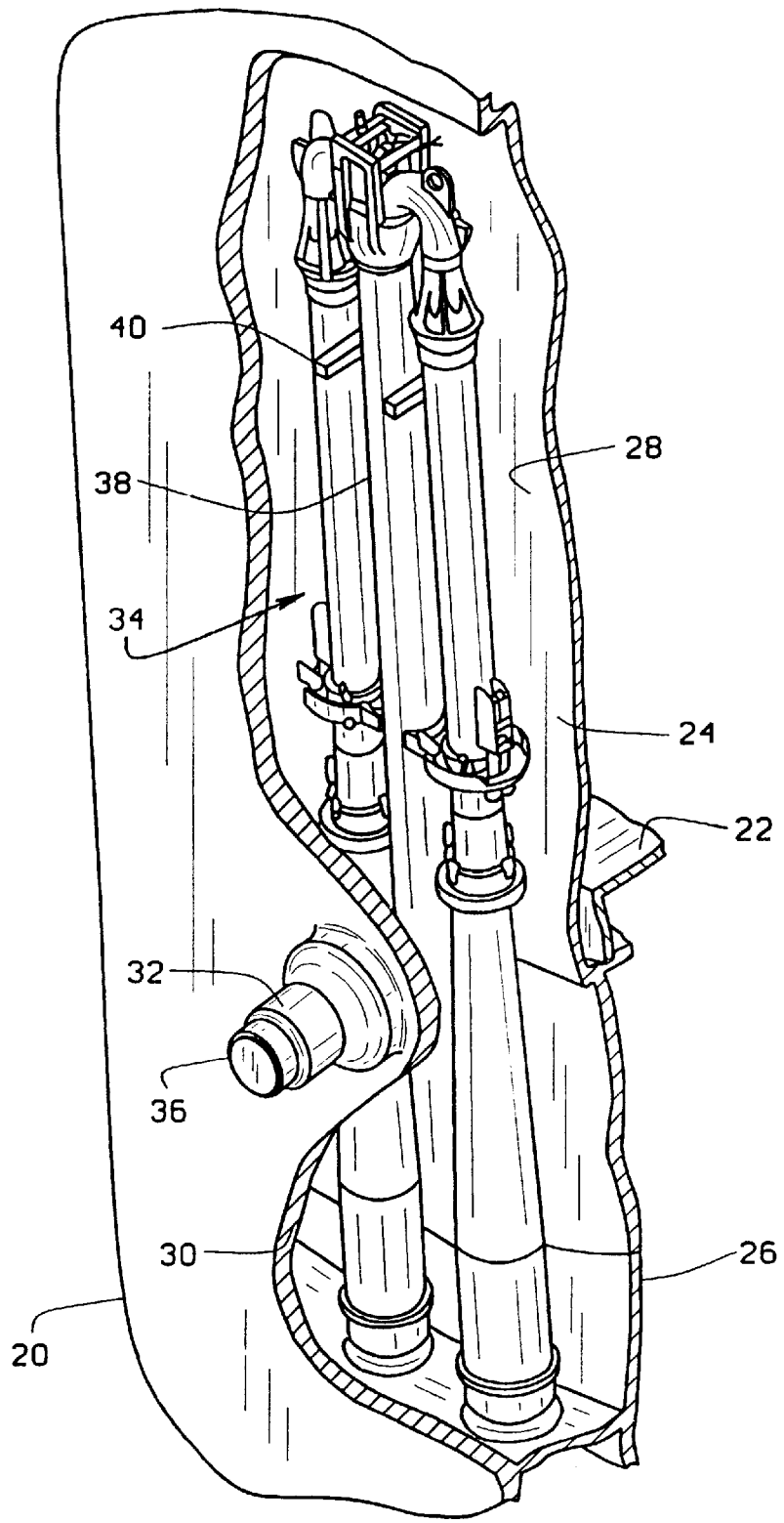
FIG. 1 is a schematic, partial cross-sectional view, with parts cut-away, of a reactor pressure vessel of a boiling water reactor.

FIG. 1 is a schematic, partial cross-sectional view, with parts cut-away, of a reactor pressure vessel (RPV) 20 for a boiling water reactor. RPV 20 has a generally cylindrical shape and is closed at one end by a bottom head and at its other end by removable top head (not shown). A top guide (not shown) is spaced above a core plate 22 within RPV 20. A shroud 24 surrounds core plate 22 and is supported by a shroud support structure 26. An annulus 28 is formed between shroud 24 and sidewall 30 of RPV 20.

An inlet nozzle 32 extends through sidewall 30 of RPV 20 and is coupled to a jet pump assembly 34. Jet pump assembly 34 includes a thermal sleeve 36 which extends through nozzle 32, a lower elbow (only partially visible in FIG. 1), and a riser pipe 38. Thermal sleeve 36 is secured at a first end (not shown) to a second end of the lower elbow. Particularly, the first end of thermal sleeve 36 is welded to the second end of the lower elbow. A first end of the lower elbow is similarly secured, or welded, to one end of riser pipe 38. Riser pipe 38 extends between and substantially parallel to shroud 24 and RPV sidewall 30. A riser brace 40 stabilizes riser pipe 38 within RPV 20. Jet pump assemblies such as assembly 34 are well known in the art, and assembly 34 is illustrated here by way of example only. The present invention can be used with many other jet pump assemblies, and is not limited to use with only assembly 34.

In addition, the present invention is not limited to practice in the boiling water reactor illustrated in FIG. 1, and the present invention could be used in many different reactors having many different alternative configurations. The boiling water reactor of FIG. 1 is illustrated by way of example only and not by way of limitation.

Figure 2:
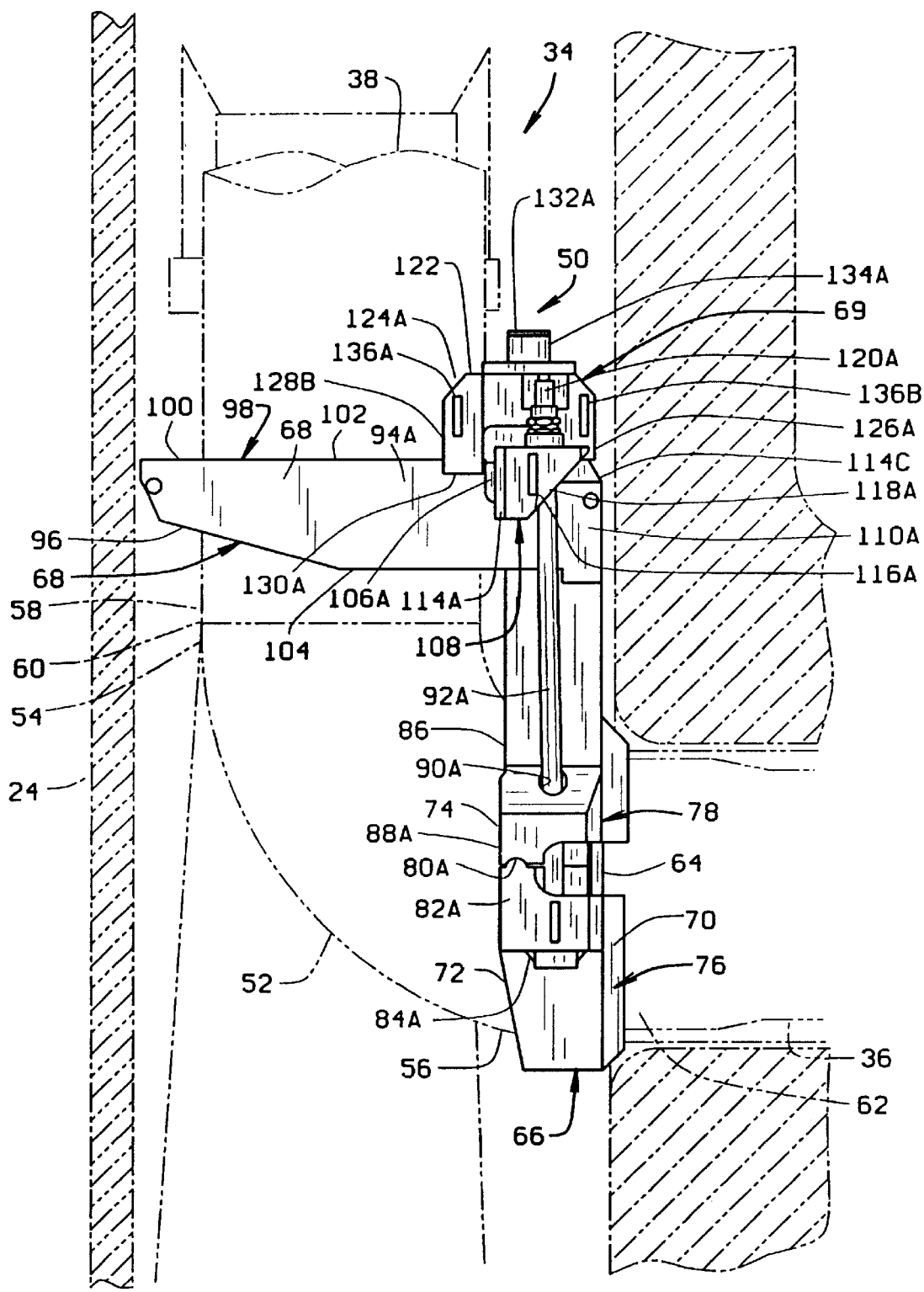
FIG. 2 is a side view of a portion of a jet pump assembly and a clamp apparatus in accordance with one embodiment of the present invention.

A clamp apparatus illustrated in FIG. 2 may be utilized to provide extra support for riser pipe 38 and the lower elbow. Particularly, FIG. 2 is a side view illustration of jet pump assembly 34 and a clamp apparatus 50 in accordance with one embodiment of the present invention. Jet pump assembly 34, as described above, includes thermal sleeve 36, riser pipe 38 and a lower elbow 52. Lower elbow 52 includes a first end 54 and a second end 56. First end 54 of lower elbow 52 is welded to a first end 58 of riser pipe 38 at an interface 60. Second end 56 of lower elbow 52 is welded to a first end 62 of thermal sleeve 36 at an interface 64. As is well known, weld crowns are formed at interfaces 60 and 64.

Clamp apparatus 50 includes a lower elbow clamp 66, a riser clamp 68, and a bridge 69. Lower elbow clamp 66 is configured to be secured to thermal sleeve 36 adjacent to interface 64, and riser clamp 68 is configured to be secured to rise pipe 38 adjacent interface 60. Lower clamp 66 and riser clamp 68 are coupled together utilizing bridge 69. Particularly, lower elbow clamp 66 is configured to extend substantially vertically, i.e., parallel to RPV sidewall 30, and couple to riser clamp 68, which is configured to extend substantially horizontally, i.e., perpendicular to RPV sidewall 30. Bridge 69 rigidly couples lower elbow clamp 66 and riser clamp 68 to limit separation of lower elbow 52 from thermal sleeve 36.

Thermal sleeve 36 extends through lower elbow clamp 66, and a flange 70 of clamp 66 engages the edge of the weld crown at interface 64. Particularly, flange 70 forms a friction fit, or interference fit, with the edge of the weld crown.

More particularly, lower elbow clamp 66 includes a lower element 72 and an upper element 74. Lower element 72 and upper element 74 include front faces 76 and 78, respectively, from which flange 70 extends. Lower element 72 has a substantially semicircular geometric shape and includes hinges 80A and 80B at respective lower element ends 82A and 82B (only hinge 80A and end 82A are shown in FIG. 2). Lower element 72 also includes two bolt openings 84A and 84B at respective ends 82A and 82B (only bolt opening 84A is shown in FIG. 2).

Upper element 74 includes a sleeve portion 86 having a substantially semicircular geometric shape with two ends 88A and 88B (only end 88A is shown in FIG. 2), and is configured to pivotally couple to lower element 72 via hinges 80A and 80B. Ends 88A and 88B of upper element 74 include respective bolt openings 90A and 90B (only bolt opening 90A is shown in FIG. 2). Bolt openings 84A and 90A, and 84B and 90B, respectively, are substantially aligned and configured to receive respective bolts 92A and 92B (only bolt 92A is shown in FIG. 2).

Riser clamp 68 is substantially "U" shaped and includes two legs 94A and 94B and a back portion 96 between legs 94A and 94B (only leg 94A and back portion 96 are shown in FIG. 2). Legs 94A and 94B and back portion 96 define a riser cavity 98 configured to receive riser pipe 38. Back portion 96 includes a radial restraint member 100 sized to fit between riser pipe 38 and shroud 24. Riser clamp 68 further includes a top side 102 and a bottom side 104, and each leg 94A and 94B includes a wedge recess 106A and 106B (only wedge recess 106A is shown in FIG. 2). Wedge recesses 106A and 106B are substantially aligned and configured to receive a wedge 108. More particularly, wedges recesses 106A and 106B are adjacent respective ends 110A and 110B of legs 94A and 94B (only leg end 110A is shown in FIG. 2).

Figure 6:
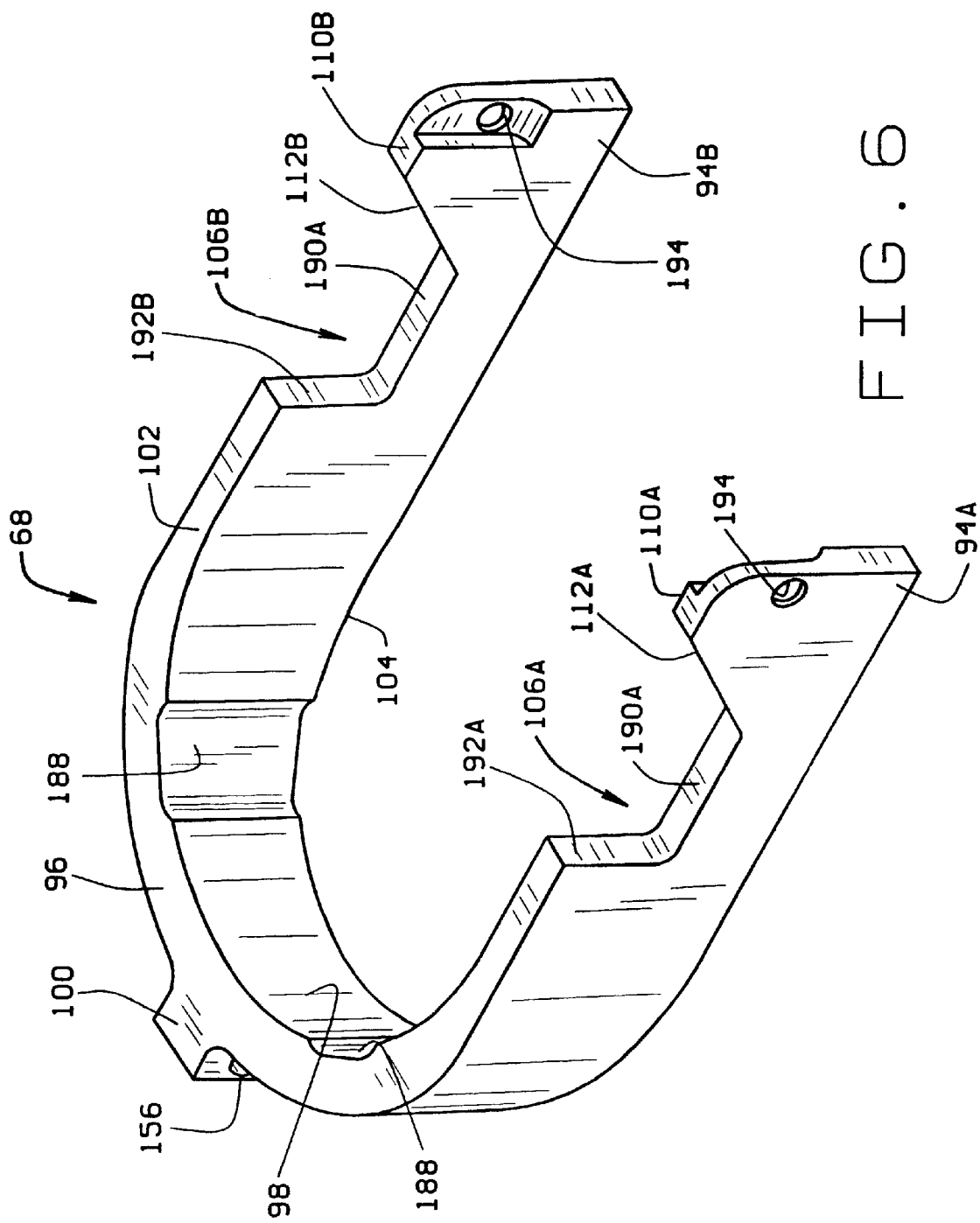
FIG. 6 is a perspective view of the riser clamp shown in FIG. 2.

Recesses 106A and 106B are defined, in part, by forward sloping surfaces (not shown) which are configured to engage wedge 108 (forward sloping surface 112A and 112B are shown in FIG. 6). Particularly, wedge 108 includes two ends 114A and 114B and an intermediate portion 114C extending between ends 114A and 114B (only end 114A and intermediate portion 114C are shown in FIG. 2). Ends 114A and 114B include sloping surfaces 116A and 116B, respectively, which are configured to abut respective forward sloping surfaces 112A and 112B of riser clamp 68 so that intermediate portion 114C extends between legs 94A and 94B of riser clamp 68 (only sloping surface 116A of wedge end 114A is shown in FIG. 2). Wedge ends 114A and 114B each include a bolt opening 118A and 118B, respectively, therein (only bolt opening 118A is shown in FIG. 2). Bolt openings 118A and 118B extend through sloping surfaces 116A and 116B, respectively, and are configured to receive bolts 92A and 92B, respectively. In addition, bolt openings 118A and 118B are positioned so that when wedge 108 is positioned in recesses 106A and 106B, and wedge ends 114A and 114B abut forward sloping surfaces 112A and 112B of riser clamp 68, bolt openings 118A and 118B are aligned with bolt openings 84A and 90A, and 84B and 90B, respectively, of lower elbow clamp 66.

Bolts 92A and 92B extend through bolt openings 84A, 90A and 118A, and 84B, 90B and 118B, respectively, to couple riser clamp 68 and lower elbow clamp 66. Particularly, securing elements 120A and 120B, e.g., nuts and washers, are used to secure bolts 92A and 92B within bolt openings 84A, 90A and 118A, and 84B, 90B and 118B, respectively.

Bridge 69 includes a substantially elongate member 122 having ends 124A and 124B (only end 124A is shown in FIG. 2), and front legs 126A and 126B (only leg 126A is shown in FIG. 2) and rear legs 128A and 128B (only leg 128A is shown in FIG. 2) extending from member 122. Legs 128A and 128B include respective flanges 130A and 130B (only flange 130A is shown in FIG. 2) extending therefrom and are configured to extend over outer surfaces of legs 94A and 94B. Bridge 69 also includes bridge bolts 132A and 132B (only bolt 132A is shown in FIG. 2) and bolt keepers 134A and 134B (only keeper 134A is shown in FIG. 2). Bridge 69 further includes tooling rings 136A, 136B, 136C, and 136D (only rings 136A and 136B are shown in FIG. 2) used for installing bridge 69.

Figure 3:
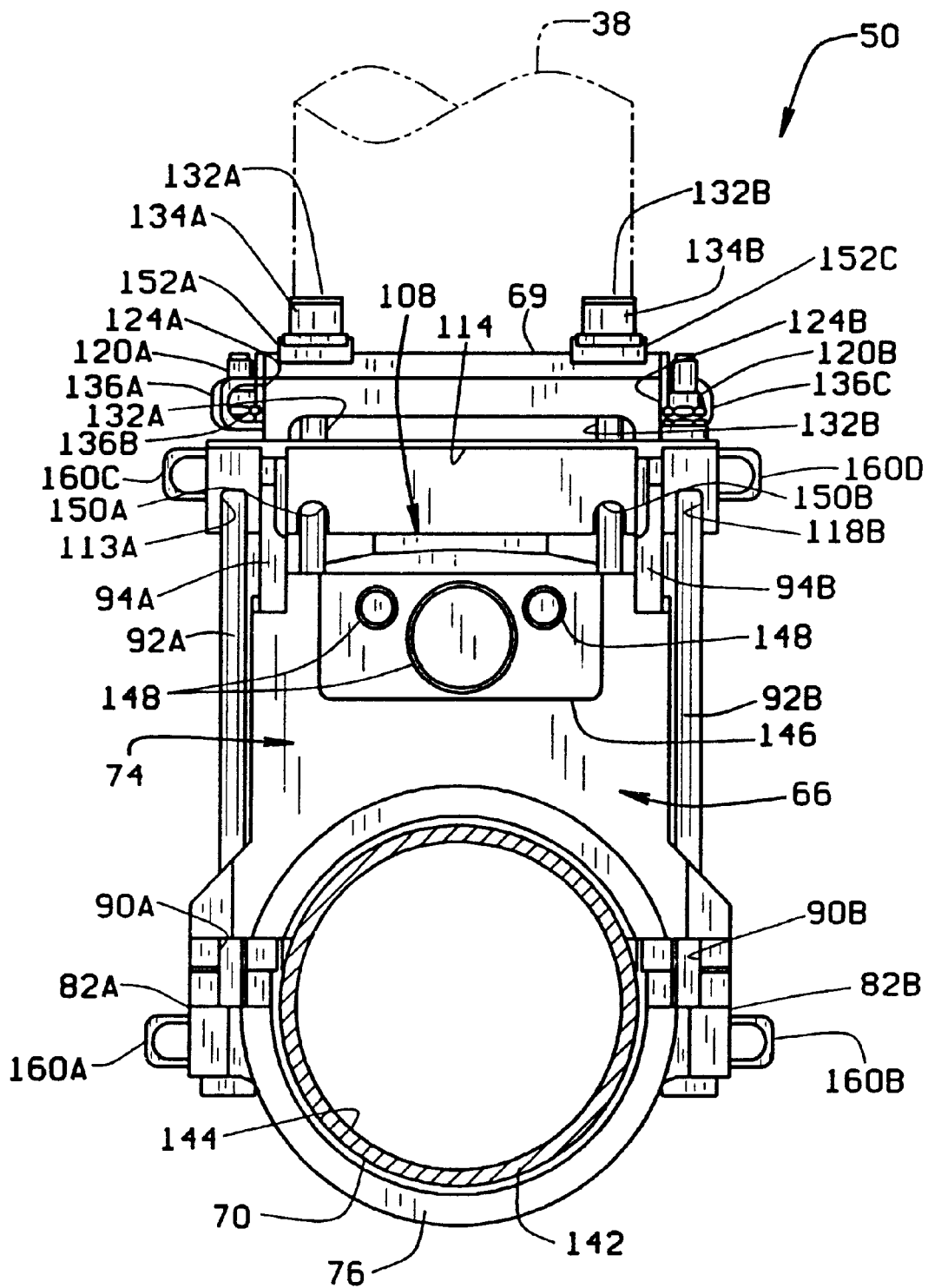
FIG. 3 is a front view of the clamp apparatus shown in FIG. 2.

Referring now to FIG. 3, which is a front view of clamp apparatus 50, flange 70 of lower elbow clamp 66 is shown at a perimeter 142 of an opening 144. Upper element 74 of lower elbow clamp 66 includes a substantially vertical portion 146 extending from semicircular sleeve portion 86. Substantially vertical portion 146 of lower elbow clamp 66 includes a plurality of apertures 148 therein, which are used for installation, and weight reduction, of clamp apparatus 50. Wedge intermediate portion 114C includes slotted third and fourth bolt openings 150A and 150B sized to receive bridge bolts 132A and 132B. Bridge 69 further includes washers 152A and 152B to be positioned between respective bolt keepers 134A and 134B and bridge 69. Bridge bolts 132A and 132B are sized to couple bridge 69 to vertical portion 146 and riser clamp 68.

Referring still to FIG. 3, clamp apparatus 50 further includes four tooling rings 160A, 160B, 160C and 160D used for installing clamp apparatus 50. Tooling rings 160A and 160B are adjacent respective ends 82A and 82B of elbow clamp lower element 72. Tooling rings 160C and 160D are adjacent respective legs 94A and 94B of riser clamp 68. Tooling rings 136A and 136B are adjacent wedge end 124A and rings 136C and 136D (only ring 136C is shown in FIG. 3) are adjacent wedge end 124B.

Figure 4A:
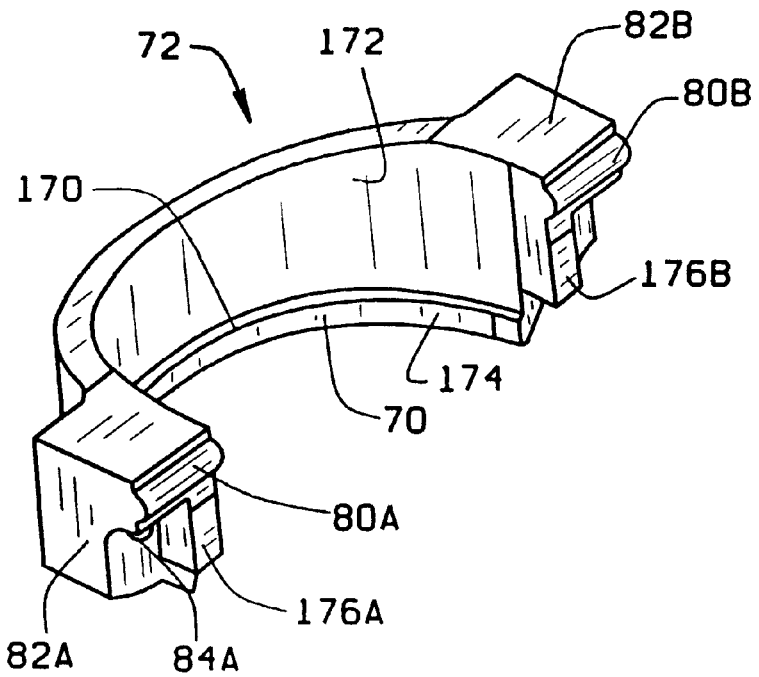
FIGS. 4a and 4b are perspective views of a lower element of the lower elbow clamp show in FIG. 2.
Figure 4B:
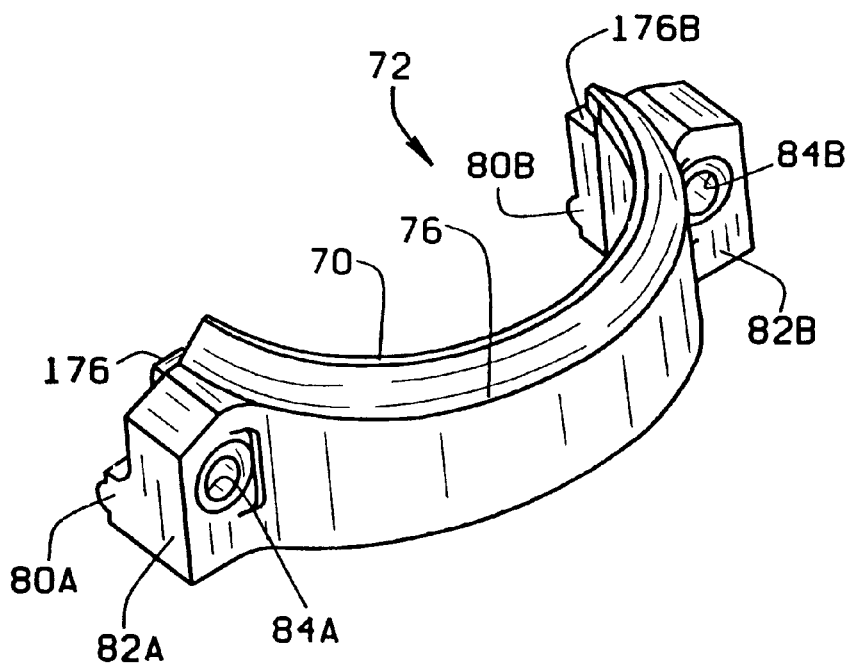

FIGS. 4*a* and 4*b* are perspective views of lower element 72 of lower elbow clamp 66. As shown, flange 70 extends from front face 76 and forms an engaging surface 170 between an inner perimeter 172 of lower element 72 and an inner perimeter 174 of flange 70. Inner perimeter 174 of flange 70 is configured to engage thermal sleeve 36 so that engaging surface 170 engages the edge of the weld crown at interface 64 between thermal sleeve 36 and lower elbow 52. Lower element 72 further includes two clamp stops 176A and 176B adjacent hinges 80A and 80B, respectively.

Figure 5A:
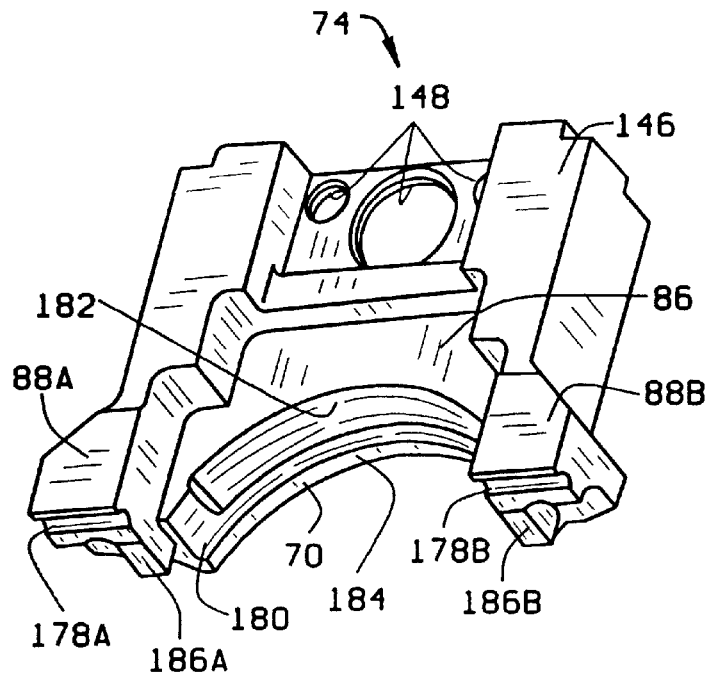
FIGS. 5a and 5b are perspective views of an upper element of the lower elbow clamp shown in FIG. 2.
Figure 5B:
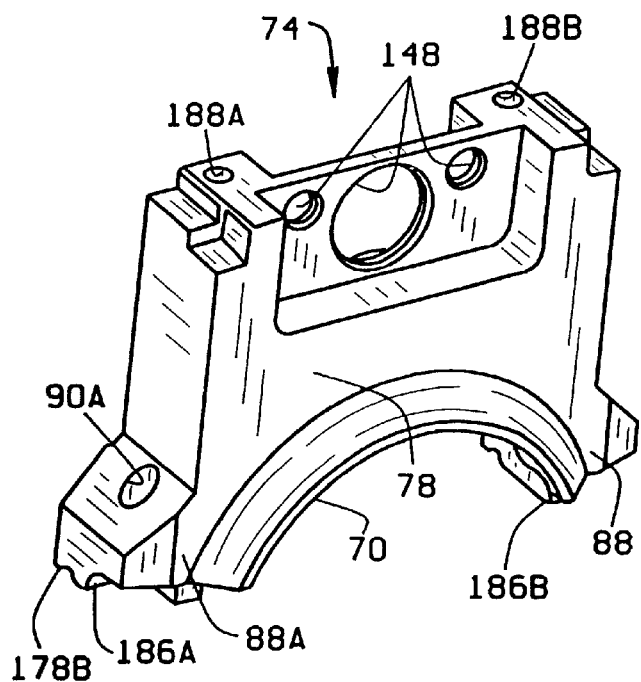

FIGS. 5*a* and 5*b* are perspective views of upper element 74 of lower elbow clamp 66. As shown, upper element ends 88A and 88B include hinge receiving channels 178A and 178B, respectively, therein. Each hinge receiving channel 178A and 178B, of course, is configured to receive respective hinge 80A and 80B to pivotally couple upper element 74 and lower element 72 of lower elbow clamp 66. In addition, and as shown, flange 70 extends from front face 78 and forms an engaging surface 180 between an inner perimeter 182 of upper element 74 and an inner perimeter 184 of flange 70. Inner perimeter 184 of flange 70 is configured to engage thermal sleeve 36 so that engaging surface 180 engages the edge of the weld crown at interface 64 between thermal sleeve 36 and lower elbow 52. Upper element 74 further includes clamp stops 186A and 186B adjacent hinge receiving channels 178A and 178B, respectively and bridge bolt openings 188A and 188B. Upper element clamp stops 186A and 186B are configured to abut lower element clamp stops 176A and 176B and thus at least partially restrict pivotal movement of lower element 72 with respect to upper element 74. Bridge bolt openings 188A and 188B are threaded and sized to receive respective bridge bolts 132A and 132B.

FIG. 6 is a perspective view of riser clamp 68. Riser clamp 68 includes two riser channels 188 which are about equidistant from riser clamp leg ends 110A and 110B, respectively. Recesses 106A and 106B, in addition to forward sloping surfaces 112A and 112B, include base surfaces 190A and 190B and rear surfaces 192A and 192B, respectively. Base surfaces 190A and 190B are about equidistant from bottom side 104, and rear surfaces 192A and 192B are about equidistant from riser clamp leg ends 110A and 110B, respectively. Rear surfaces 192A and 192B also are spaced sufficiently from forward sloping surfaces 112A and 112B, respectively, so that wedge ends 114A and 114B may be inserted into recesses 106A and 106B, respectively. Riser clamp 68 further includes a plurality of openings 194 which are used for installation, and weight reduction, of riser clamp 68. Particularly, leg ends 110A and 110B each include one opening 194 and radial restraint member 100 includes one opening.

Figure 7A:
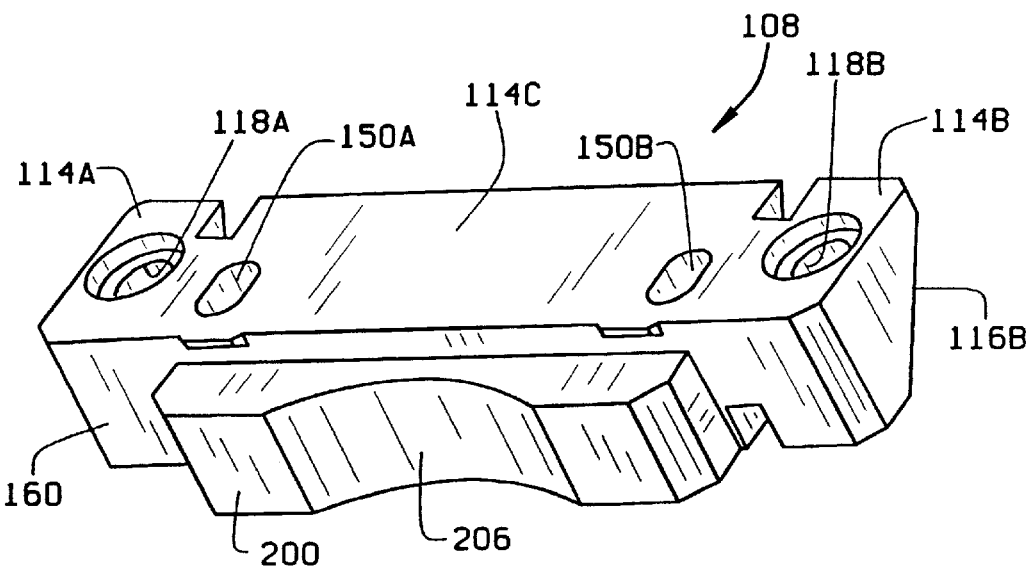
FIGS. 7a and 7b and are perspective views of the wedge shown in FIG. 2.
Figure 7B:
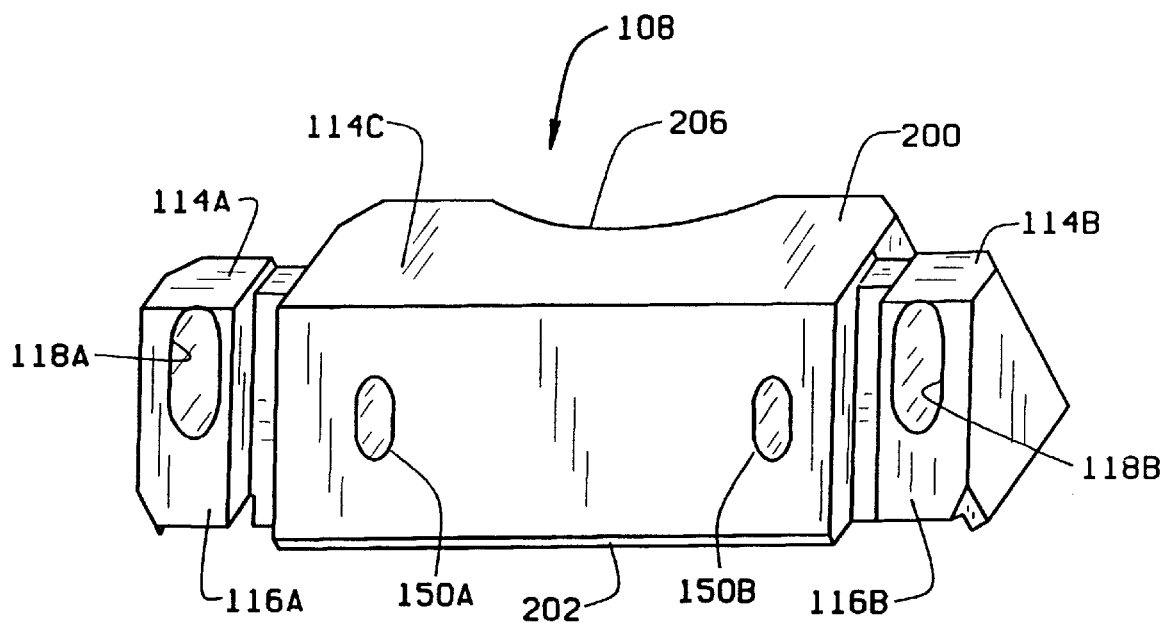

FIGS. 7*a* and 7*b* are perspective views of wedge 108. Wedge 108 includes a riser pipe portion 200. Riser pipe portion 200 extends from a back side 202 of wedge 108, and includes a semicircular perimeter 206 that is configured to engage riser pipe 38. Particularly, riser pipe portion 200 is configured so that when sloping surfaces 116A and 116B of wedge 108 engage forward sloping surfaces 112A and 112B of riser clamp 68, riser pipe portion 200 engages riser pipe 38.

Figure 8A:
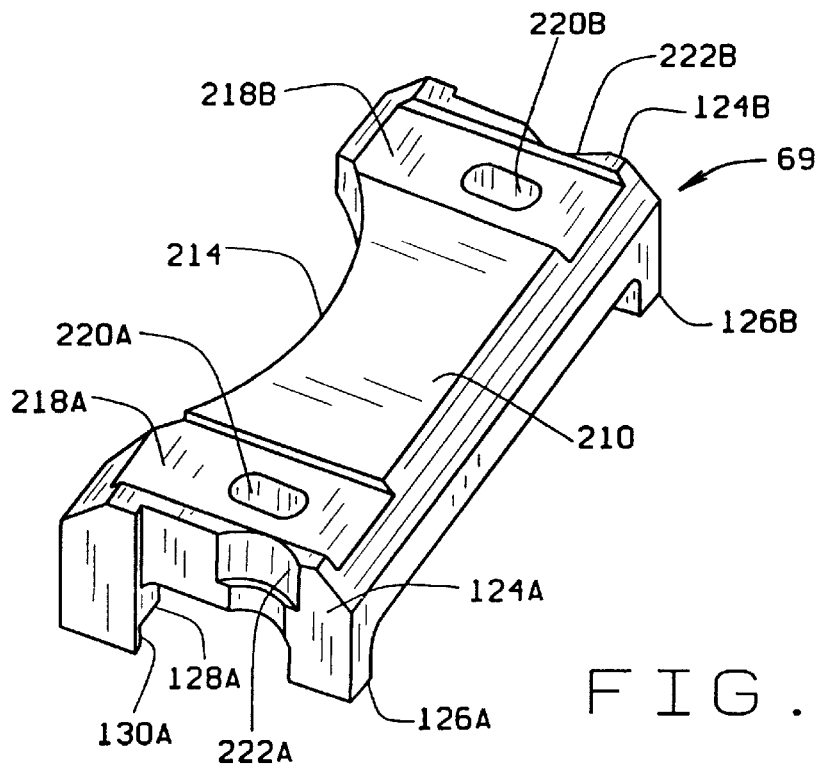
FIGS. 8a and 8b are perspective views of the bridge shown in FIG. 2.
Figure 8B:
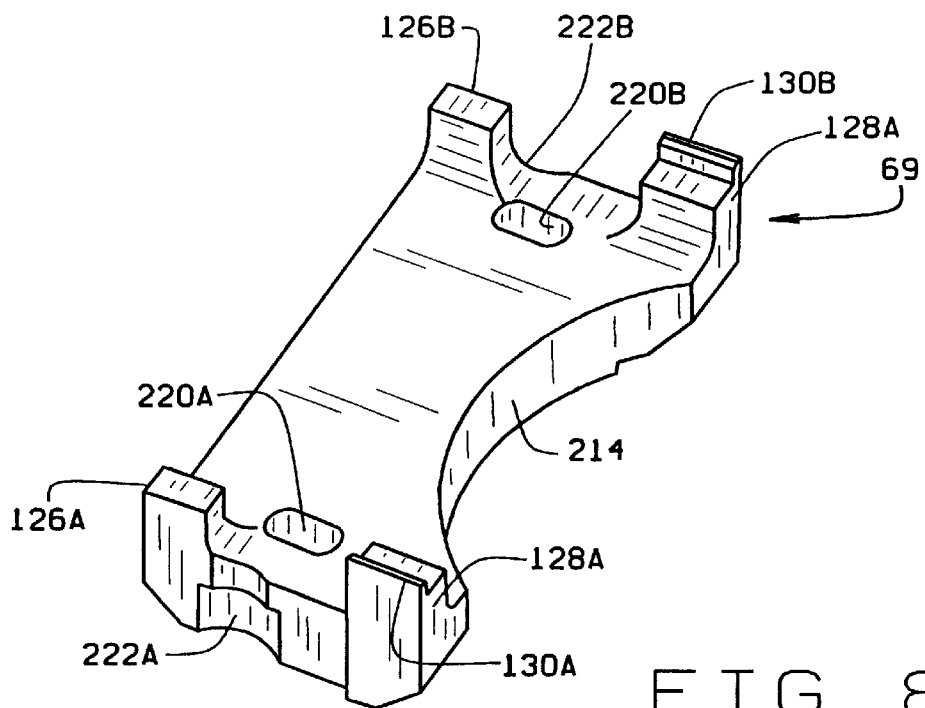

FIGS. 8*a* and 8*b* are perspective views of bridge 69. Bridge 69 includes a top 210 and a semi-circular pipe portion 214 configured to engage riser pipe 38. Parallel spaced grooves 218A and 218B are located at opposite ends 124A and 124B of top 210 and are configured to receive washers 152A and 152B. Bridge 69 also includes bridge bolt openings 220A and 220B and notches 222A and 222B. Bridge bolt openings 220A and 220B are slotted to allow proper positioning and sized to receive respective bridge bolts 132A and 132B. Clearance notches 222A and 222B extend into respective ends 124A and 124B and are sized to allow access to respective securing elements 120A and 120B.

To assemble clamp apparatus 50, lower elbow clamp 66 is positioned adjacent interface 64 between thermal sleeve 36 and lower elbow 52 to engage the weld crown at such interface 64. Particularly, and for example, lower element 72 is pivotally couple to upper element 74 of lower elbow clamp 66. Lower element 72 and upper element 74 of lower elbow clamp 66 are then rotated with respect to each other via hinges 80A and 80B and positioned so that inner perimeters 174 and 184 of flange 70 engage thermal sleeve 36 and engaging surfaces 170 and 180 engage the edge of the weld crown at interface 64 between thermal sleeve 36 and lower elbow 52. Hinges 80A and 80B facilitate engaging lower elbow clamp 66 to the edge of the weld crown without physically contacting RPV sidewall 30. Accordingly, substantially horizontal movement of lower elbow clamp 66 is restricted by the connection between the weld crown and flange 70. Riser clamp 68 is then positioned adjacent lower interface 60 between lower elbow 52 and riser pipe 38. Particularly, riser clamp 68 is secured to riser pipe 38 at a location above interface 60 so that riser pipe 38 extends through riser pipe cavity 98 and so that legs 94A and 94B extend substantially horizontally and radial restraint member 100 is between riser pipe 38 and shroud 24.

To couple lower elbow clamp 66 to riser clamp 68, wedge 108 is coupled to riser clamp 68. Particularly, wedge 108 is inserted into riser clamp recesses 106A and 106B so that wedge sloping surfaces 116A and 116B engage riser clamp forward sloping surfaces 112A and 112B, and so that bolt openings 118A and 118B extend substantially vertically and are substantially aligned with bolt openings 84A and 90A, and 84B and 90B of lower elbow clamp lower element 72 and lower clamp upper element 74, respectively.

Bolt 92A is extended through substantially aligned bolt openings 84A, 90A and 118A and securing element 120A, i.e., a nut and washer, secures bolt 92A within such bolt openings. Similarly, bolt 92B is extended through substantially aligned bolt openings 84B, 90B and 118B and securing element 120B, i.e., a nut and washer, secures bolt 92B within such bolt openings. Accordingly, riser clamp 68 is secured to lower elbow clamp 66.

Securing elements 120A and 120B are tightened to apply a clamping load to riser clamp 68 and lower elbow clamp 66. As shown in FIG. 2, bolts 92A and 92B extend substantially vertically through sloping surfaces 116A and 116B of wedge 108. By tightening bolts 92A and 92B, riser clamp 68 is drawn towards bolts 92A and 92B, and clamp 68 is drawn into a tight fit with riser pipe 38. Similarly, tightening bolts 92A and 92B applies both an upward, vertical force on lower elbow clamp 66 and a horizontal force on lower elbow clamp 66 in a direction toward shroud 24. By simultaneously clamping riser pipe 38 in place with riser clamp 68, and by clamping lower elbow clamp 66 as described above, compression forces are applied to lower elbow 52 and interfaces 60 and 64.

Bridge 69 is coupled to wedge 108 to provide additional support to riser clamp 68 and lower elbow clamp 66 connection. Bridge 69 is positioned over wedge 108 so that riser portion 214 is adjacent to riser pipe 38. Front legs 126A and 126B, and rear legs 128A and 128B rest on riser clamp 68. Particularly, front legs 126A and 126B rest on top surface of riser clamp leg ends 110A and 110B and rear legs 128A and 128B rest on riser clamp top side 102. After aligning opening 220A with openings 150A and 188A and opening 220B with openings 150B and 188B, washers 152A and 152B and bolt keepers 134A and 134B are positioned over respective bolt openings 220A and 220B. Respective bridge bolts 132A and 132B are then extended through respective bolt keepers 134A and 134B, washers 152A and 152B, bolt openings 220A and 220B, and bolt openings 150A and 150B. Bridge bolts 132A and 132B are then threadedly engaged to bolt openings 188A and 188B. Securing of bolts 132A and 132B transmits operational loads from bolts 92A and 92B to riser clamp 68 so that riser clamp 68 and lower elbow clamp 66 are rigidly coupled together.

The above-described clamp apparatus 50 places a compression clamping force on the piping and welds between lower elbow clamp 66 and riser clamp 68. In addition, clamp apparatus 50 rigidly holds riser pipe 38 to lower elbow 52 to limit separation, and is easy to install.

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the appended claims.

What is claimed is:

1. A clamp apparatus for securing a thermal sleeve, elbow and riser pipe assembly in a nuclear reactor, said clamp apparatus comprising:

a lower elbow clamp configured to be positioned adjacent an interface between the elbow and the thermal sleeve;

a riser clamp configured to be secured to the riser pipe at a location adjacent an interface between the riser pipe and the elbow;

a wedge coupled to said riser clamp, said wedge comprising a semicircular riser pipe portion configured to engage said riser pipe; and a bridge configured to rigidly couple said lower elbow clamp to said riser clamp.

2. A clamp apparatus in accordance with claim 1 wherein the interface between the elbow and the thermal sleeve includes a weld crown, and said lower elbow clamp is configured to engage the edge of the weld crown.

3. A clamp apparatus in accordance with claim 2 wherein said lower elbow clamp includes a flange.

4. A clamp apparatus in accordance with claim 1 wherein said lower elbow clamp comprises a lower element and an upper element, said lower element pivotally coupled to said upper element.

5. A clamp apparatus in accordance with claim 1 wherein said riser clamp is substantially "U" shaped having two legs, each said leg comprising a recess therein, and wherein said wedge is positioned in said recesses so that a portion of said wedge extends between said recesses.

6. A clamp apparatus in accordance with claim 5 wherein said wedge comprises first and second bolt openings, and wherein said lower elbow clamp comprises first and second bolt openings, said first and second wedge bolt openings substantially vertically aligned with said respective first and second lower elbow clamp bolt openings, and wherein said clamp apparatus further comprises two bolts, one of said bolts configured to extend through said first bolt openings and the other-of said bolts configured to extend through said second bolt openings.

7. A clamp apparatus in accordance with claim 1 wherein said bridge and lower elbow clamp each comprise first and second bolt openings, and wherein said wedge comprises third and fourth bolt openings substantially vertically aligned with said respective bridge and lower elbow clamp first and second bridge bolt openings, and wherein said clamp apparatus further comprises two bridge bolts, one of said bolts configured to extend through said first bridge bolt opening, said wedge third bolt opening, and said lower elbow clamp first bolt opening and the other of said bridge bolts configured to extend through said second bridge bolt opening, said wedge fourth bolt opening, and said lower elbow clamp second bolt opening.

8. A clamp apparatus in accordance with claim 7 wherein said lower elbow clamp first and second bolt opening are threaded, and wherein said bridge bolts threadedly engage said lower elbow clamp first and second bolt openings.

9. A clamp apparatus in accordance with claim 1 wherein said riser clamp includes a back portion and a restraint member extending therefrom.

10. A method of assembling a clamp apparatus for securing a thermal sleeve, elbow and riser pipe assembly in a nuclear reactor, the clamp apparatus including a lower elbow clamp, a riser clamp, a wedge, and a bridge, said method comprising:

positioning the lower elbow clamp adjacent an interface between the elbow and the thermal sleeve;

coupling the wedge to the riser clamp;

positioning the riser clamp adjacent an interface between the riser pipe and the elbow so the wedge engages the riser pipe; and positioning the bridge adjacent the lower elbow clamp and the riser clamp.

11. A method in accordance with claim 10 further comprising the step of coupling the riser clamp to the lower elbow clamp.

12. A method in accordance with claim 10 wherein the wedge has first and second bolt openings and the lower elbow clamp has first and second bolt openings, and wherein said method further comprises the steps of extending a first bolt through the first bolt openings and extending a second bolt through the second bolt openings.

13. A method in accordance with claim 12 wherein the wedge includes an intermediate portion and the riser clamp includes a top side, and wherein positioning the bridge adjacent the lower elbow clamp and the riser clamp includes the steps of positioning the bridge on the top side of the riser clamp.

14. A method in accordance with claim 13, wherein the bridge and the lower elbow clamp each have first and second bolt openings and the wedge has third and fourth bolt openings, and wherein said method further comprises the steps of extending a first bridge bolt through the bridge first bolt opening, the wedge third bolt opening, and the lower elbow clamp first bolt opening and extending a second bridge bolt through the bridge second bolt opening, the wedge fourth bolt opening, and the lower elbow clamp second bolt opening.

15. A method in accordance with claim 10 wherein the lower elbow clamp includes an upper element and a lower element, and wherein said method further comprises the step of pivotally coupling the lower element to the upper element.

16. A method in accordance with claim 10 wherein the interface between the elbow and the thermal sleeve includes a weld crown, and wherein positioning the lower elbow clamp adjacent the interface between the elbow and the thermal sleeve includes the step of engaging the lower elbow clamp to the edge of the weld crown.

17. A bridge apparatus for rigidly coupling a lower elbow clamp and a riser clamp in a nuclear reactor, said bridge apparatus comprising:

a bridge member having at least one bridge bolt opening wherein said bridge bolt opening is slotted; and at least one bridge bolt for coupling said bridge member to the lower elbow clamp and the riser clamp.

18. A bridge apparatus in accordance with claim 17 wherein said bridge apparatus includes a top portion and a semi-circular pipe portion, said semi-circular pipe portion configured to engage a riser pipe.

* * * * *